(12) United States Patent
Haverlag et al.

(10) Patent No.: US 12,317,393 B2
(45) Date of Patent: May 27, 2025

(54) PROXIMITY-BASED COMMISSIONING SYSTEM

(71) Applicant: SIGNIFY HOLDING B.V., Eindhoven (NL)

(72) Inventors: Marco Haverlag, Mierlo (NL); Francisco Jose Estevez Ortiz, Veldhoven (NL); Rene Van Honschooten, Nuenen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 75 days.

(21) Appl. No.: 17/768,345

(22) PCT Filed: Oct. 12, 2020

(86) PCT No.: PCT/EP2020/078533
§ 371 (c)(1),
(2) Date: Apr. 12, 2022

(87) PCT Pub. No.: WO2021/074046
PCT Pub. Date: Apr. 22, 2021

(65) Prior Publication Data
US 2024/0155756 A1    May 9, 2024

(30) Foreign Application Priority Data

Oct. 15, 2019  (EP) .................................... 19203263

(51) Int. Cl.
*H05B 47/19* (2020.01)
*H04W 48/16* (2009.01)
*H04W 52/28* (2009.01)

(52) U.S. Cl.
CPC ............ *H05B 47/19* (2020.01); *H04W 48/16* (2013.01); *H04W 52/283* (2013.01)

(58) Field of Classification Search
CPC .... H05B 47/19; H04W 48/16; H04W 52/283; H04W 48/08; Y02B 20/40; Y02D 30/70
See application file for complete search history.

(56) References Cited

U.S. PATENT DOCUMENTS

| 9,544,978 | B2 | 1/2017 | Mohan et al. |
| 9,667,352 | B2 | 5/2017 | Niewczas et al. |

(Continued)

FOREIGN PATENT DOCUMENTS

| CA | 2922446 A1 | 3/2017 |
| JP | 2015089114 A | 5/2015 |

(Continued)

*Primary Examiner* — Pamit Kaur

(57) ABSTRACT

To commission a plurality of nodes (200) to a network (100), a proximity-based commissioning has certain benefits. However, to get a proper proximity estimation in an area with a large number of nodes (200) deployed in a dense network may not be an easy task. To address this problem, nodes (200) to be commissioned are configured to spend most of its time on detecting beacons from a commissioning device (300) to derive proximity information in a one-to-many topology. And then the node (200) is further configured to feedback the proximity information to the commissioning device (300) at an adaptive beacon rate to further assist the commissioning device (300) to implement the proximity-based commissioning.

15 Claims, 4 Drawing Sheets

(56) References Cited

U.S. PATENT DOCUMENTS

| | | | |
|---|---|---|---|
| 10,098,074 B2 | 10/2018 | Baker et al. | |
| 10,142,793 B2 | 11/2018 | Pandharipande et al. | |
| 10,182,487 B2 | 1/2019 | Mohan et al. | |
| 10,183,487 B2 | 1/2019 | Kanzaki et al. | |
| 2003/0163579 A1* | 8/2003 | Knauerhase ......... | H04W 36/22 |
| | | | 709/227 |

FOREIGN PATENT DOCUMENTS

| | | |
|---|---|---|
| JP | 2018036165 A | 3/2018 |
| JP | 2019526952 A | 9/2019 |
| WO | 2017036771 A1 | 3/2017 |
| WO | 2017162550 A1 | 9/2017 |
| WO | 2018024533 A1 | 2/2018 |

* cited by examiner

PROXIMITY-BASED COMMISSIONING SYSTEM

CROSS-REFERENCE TO PRIOR APPLICATIONS

This application is the U.S. National Phase application under 35 U.S.C. § 371 of International Application No. PCT/EP2020/078533, filed on Oct. 12, 2020, which claims the benefit of European Patent Application No. 19203263.9, filed on Oct. 15, 2019. These applications are hereby incorporated by reference herein.

FIELD OF THE INVENTION

The invention relates to the field of commissioning in wireless communication networks. More particularly, various methods, apparatus, systems and computer-readable media are disclosed herein related to controlling the commissioning of a plurality of nodes to a wireless network by a commissioning device based on proximity.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards like Zigbee, Thread, BLE, BLE mesh, Wi-Fi, Wi-Fi direct, and various proprietary network implementations built on top of the IEEE 802.15.4, IEEE 802.15.1 or IEEE 802.11 standards. Before the system can be used in practice the various wireless nodes that constitute the network must be configured.

The most common method to accomplish this is to have one wireless device (in most cases a gateway or bridge) to open a wireless network and have the factory new wireless nodes automatically join this network by a process called auto-joining. After the network has been formed in this way the commissioning engineer can identify each fixture one-by-one by sending blink commands to each device and register each device to its location of group. Since in this process there is no relation identified on the distance from the commissioning device to the fixtures, the node will typically appear in a random way, which mean that quite some time is spent in locating the devices.

U.S. Ser. No. 10/182,487 B2 is related to distributed light fixture beacon management, where one apparatus of the light fixture includes a sensor unit and a light intensity controller. The sensor unit includes a sensor operative to generate a sense signal based on at least one of sensed motion or light, wireless communication circuitry operative to maintain a link with a network, and a controller. The controller is operative to manage communication with the network, manage reception of beacons through the wireless communication circuitry, wherein the beacons are received from an object, and the beacons include information associated with the object, and generate dimming control base on at least one of the sensed signal and communication from the network.

WO2017036771 A1 is related to a system comprising a plurality of components connected in a wireless network and at least one unconnected (new) component available to join the network. The components are divided amongst a plurality of luminaires, each comprising a respective subgroup of the components including at least one lamp, and each subgroup has a respective subgroup ID. Upon detecting that the previously-present component of the same respective subgroup as a first component is missing, the first component automatically causes the new component to be joined to the wireless network, and to be assigned to the same subgroup as the first component under the same subgroup ID.

WO2017162550 A1 is related to a method of automatically commissioning a lighting system comprising a plurality of luminaires for illuminating one or more regions within a space. The method comprises: receiving signals from a positioning system, indicating a respective location within the space at which each of a plurality of physical entities is detected by the positioning system, each of the entities being a person or a movable nonhuman object. The method further comprises determining a spatial distribution of at least some of the entities based on the locations indicated by the signals from the positioning system, and determining a region within the space corresponding to this spatial distribution.

U.S. Ser. No. 10/098,074 B2 is related to a load control system that includes control devices capable of being associated with each other at one or more locations for performing load control. Control devices may include control-source devices and/or control-target devices. A location beacon may be discovered and a unique identifier in the location beacon may be associated with a unique identifier of one or more control devices. Upon subsequent discovery of the location beacon, the associated load control devices may be controlled. The beacons may be communicated via radio frequency signals, visible light communication, and/or audio signals.

SUMMARY OF THE INVENTION

Given the drawbacks of the auto-joining, in an alternative way of working the system does not let the devices join automatically, but only after a trigger has been given by the commissioning device. In this method, the factory new devices are supposed to send out beacons to invite the commissioning device for commissioning. The commissioning device does a local scan first, and then orders the devices according to the proximity by setting up a one-to-one connection with every node in the order of proximity.

However, when there are large collections of factory new devices deployed in a highly dense network, the beacons from these factory new devices may conflict with one another, which makes the commissioning procedure even problematic.

In view of the above, the present disclosure is directed to methods, apparatus, systems, computer program and computer-readable media for providing a mechanism related to an improved method to enable proximity-based commissioning. More particularly, the goal of this invention is achieved by a node as claimed in claim 1, by a commissioning device as claimed in claim 8, by a system as claimed in claim 12, by a method as claimed in claims 13 and 14 for the node and the commissioning device respectively, and by a computer program as claimed in claim 15.

Accordingly, to reduce the conflict among beacons from the nodes, or the factory new devices, the nodes will first spend most of the time listen to the channel, instead of sending beacons. At the same time, the commissioning device is configured to spend most of its time on sending another type of beacons to facilitate the nodes to measure the proximity. In such a manner, the topology of the source device(s) of the beacons and the intended destination device(s) changes from many-to-one to one-to-many in most occasions, and hence, a high collision rate is suppressed. The nodes will take the role in measuring the proximity and then they provide such proximity information to the commissioning device to allow the commissioning device to decide the order for commissioning among multiple nodes.

In accordance with a first aspect of the invention a node is provided. A node out of a plurality of nodes for assisting a proximity-based commissioning of the plurality of nodes by a commissioning device to a network operating according to a first wireless communication protocol, the node comprising a first receiver configured to detect a first type of beacons from the commissioning device via a second wireless communication protocol, with a first initial duty cycle applied to the first receiver; a first transmitter configured to send a second type of beacons at an initial beacon rate via the second wireless communication protocol; a controller configured to determine a proximity indicator, the proximity indicator reflecting the proximity between the node and the commissioning device based on the first type of beacons detected by the first receiver. The first transmitter is further configured to update the second type of beacons when the proximity indicator is available, and the updated second type of beacons comprises the proximity indicator. The first transmitter is then configured to send the updated second type of beacons at an increased beacon rate as compared to the initial beacon rate via the second wireless communication protocol, when the proximity indicator is equal to or above a predefined threshold. The first transmitter is further configured to send only when the first receiver is not detecting.

The node can be any factory new device to be commissioned to a wireless network. In a lighting context, the node may for example be a lighting device, a luminaire, a sensor, or a switch.

The first type of beacons is a kind of advertisement broadcast by the commissioning device. By receiving the first type of beacons, the node is aware of the presence of the commissioning device in the vicinity. In order to detect such beacons, the first receiver is configured to be on with the first initial duty cycle. A duty cycle D indicates the fraction of one period in which a system is active, or $D=T_{active}/T_{period}$. In this scenario, with one entire cycle of $T_{period}$, the duration of $T_{active}$ should cover at least one beacon duration. Preferably, the first receiver is configured to receive with a first initial duty cycle $D_{1st\_RX}$ at least 50%.

The second type of beacons are used by the node to advertise itself and to invite the commissioning device for commissioning. The first transmitter is configured to send only when the first receiver is not detecting. And hence the duty cycle $D_{1st\_TX}$ of the first transmitter may not be larger than $1-D_{1st\_RX}$. In a practical system, the first transmitter and the first receiver may be comprised in a single transceiver, and then the transceiver is half-duplexed, which cannot send and receive at the same time.

Therefore, from the start a factory new node is configured to monitor the channel and try to detect the approaching of a potential commissioning device, and to send out its own advertisement with a relative low frequency, such as the initial beacon rate $R_{beacon}$. The interval between two adjacent beacons, or the beacon interval, is $1/R_{beacon}$. This is because when there is no commissioning device nearby, frequent beacons from the node will not improve the speed for commissioning, but instead those frequent beacons may only result in extra power consumption of the node and more conflicts with beacons from other nodes or an approaching commissioning device. After detecting the first type of beacons from the commissioning device, the node can derive a proximity indicator that reflects the proximity between the node and the commissioning device. And then the node is further configured to update the second type of beacons by including the proximity indicator in the updated second type of beacons to feedback the proximity information to the commissioning device. The node can be configured to send the updated second type of beacons at the initial beacon rate via the second wireless communication protocol, when the proximity indicator is below a predefined threshold. Only when the commissioning device is close enough, such as the proximity indicator is equal to or above the predefined threshold, the first transmitter is encouraged to send the updated second type of beacons more frequently to increase the chance that those beacons will be received by the commissioning device. Hence, the beacon rate of a node is controlled adaptively to further facilitate the efficient proximity measurement.

Preferably, the first wireless communication protocol is different from the second wireless communication protocol. And then the communication via the second wireless communication protocol for deriving proximity information will not affect the data communication via the first wireless communication protocol for the nodes that are already connected to the network. Whereas the second wireless communication protocol is mainly for a point-to-point connection or a star topology, the network using the first wireless communication protocol may adopt a star topology, a tree topology, a mesh topology, or a hybrid of different topologies.

Advantageously, the proximity indicator is a moving average value of a propagation characteristic of the first type of beacons detected by the first receiver.

The proximity indicator indicates the proximity or distance between two objects, which are the node and the commissioning device in this context. The proximity or distance can be derived according to a propagation characteristic of electromagnetic waves, such as time of flight or path attenuation principle. To get a relatively accurate estimation on the proximity, a moving average calculation is typically adopted to filter out certain variation on the channel, such as small-scale fading. And then the proximity indicator can represent honestly the propagation characteristic of the first type of beacons detected by the node from the commissioning device.

In one embodiment, the proximity indicator is an average link quality indicator, LQI, or an average received signal strength indicator, RSSI, value, of the first type of beacons detected by the first receiver.

Preferably, LQI or RSSI can be used as the parameter to identify the proximity indicator, as LQI or RSSI measurements are already adopted by many wireless communication protocols and supported by the radio chips.

Preferably, the second wireless communication protocol is in accordance with a Bluetooth low energy, BLE, standard.

Beneficially, BLE beacons are used to measure the proximity information and to set up the one-to-one connection between the commissioning device and the node. The first type of beacons sent by the commissioning device can be non-connectable BLE beacons, while the second type of beacons sent by the node can be connectable BLE beacons.

Preferably, the first wireless communication protocol is in accordance with a Zigbee standard.

Zigbee standard is widely adopted in home automation and lighting control applications. The Zigbee network layer natively supports both star and tree networks, and generic mesh networking. The powerful topology control provides it great flexibility in a control system. However, the initial set up of the network, and especially the commissioning of a large number of nodes to the network in an orderly manner, can be troublesome, as addressed in the beginning of this application. With the new BLE and Zigbee combo node, it is beneficial to make use of the easy setup of point-to-point connections in a BLE system to facilitate the commissioning of nodes to a Zigbee network. Operating the two procedures, commissioning and data communication, with two different wireless communication protocols further simplifies the scheduling of the system.

Advantageously, the first receiver is further configured to detect the first type of beacons from the commissioning device with a reduced duty cycle lower than the first initial duty cycle applied to the first receiver, when the estimated indicator on proximity is equal to or above the predefined threshold.

Since the first transmitter is configured to send only when the first receiver is not detecting, by reducing the duty cycle of the first receiver, the first transmitter has more time to send. This use of an increased beacon rate of the first transmitter when the commissioning device is considered to be sufficiently close can further facilitate commissioning.

Preferably, wherein the first transmitter is configured to transmit at a default output power level and is further configured to derive a reduced output power level as compared to the default output power level dependent on the proximity indicator; and to further update the second type of beacons by further comprising information on the reduced output power level. The further updated second type of beacons are then sent by the first transmitter at the reduced output power level.

Typically, the nodes, as well as the commissioning device, send out beacons at a default output power, which is usually the maximum output power. For short range wireless communication, such as a Zigbee or BLE system, the maximum output power is usually around 0 dBm. To send the beacon at the maximum output power means maximum coverage, but the drawback can be more interference to the other nodes in its surroundings. In this case, when the node identifies that the commissioning device is in close vicinity, it may opt to reduce its output power for power saving by itself, and also to avoid unnecessary interference to other nodes, as long as sufficient signal strength of the received signal can be achieved at the commissioning device side. To enable the commissioning device to get a correct estimation of proximity based on the second type of beacons received by the commissioning device, it is necessary to include the reduced output power level in the beacons. For certain communication protocols, the output power may already be included in the default beacon packet, and then there is no needed to further update the second type of beacons.

In accordance with a second aspect of the invention a commissioning device is provided. A commissioning device for carrying out an efficient proximity-based commissioning of a plurality of nodes to a network operating according to a first wireless communication protocol, the commissioning device comprises a second transmitter configured to send a first type of beacons via a second wireless communication protocol with a second initial duty cycle applied to the second transmitter; a second receiver configured to detect another type of beacons from at least one node out of the plurality of nodes via the second wireless communication protocol; a controller configured to determine if the other type of beacons, detected by the second receiver from the at least one node, comprise a proximity indicator. The controller is further configured to generate a registered proximity indicator for each one of the at least one node, and the registered proximity indicator is determined according to the proximity indicator comprised in the other type of beacons received from each one of the at least one node. The controller is further configured to determine for each one of the at least one node if it is close enough for commissioning, by verifying if the registered proximity indicator is equal to or above a second predefined threshold. The second receiver is further configured to detect only when the second transmitter is not transmitting.

Instead of passively listening to the advertisement from the factory new devices and to determine the order for commissioning in a conventional manner, in accordance with this invention the commissioning device is disclosed to first announce its presence by sending the first type of beacons with high frequency to facilitate the proximity measurement at the factory new device side. And then the commissioning device is configured to generate the registered proximity indicator according to the proximity indicator received from the node in the second type of beacons. In generating the registered proximity indicator, the commissioning device can selectively use the proximity indicator reported by a certain node. For example, if the commissioning device considers a proximity indicator is reliable only when the node is within certain proximity reflected by the value of a proximity indicator above a predetermined threshold. This can be beneficial to alleviate or filter out the impact of certain interference on the proximity estimation. The registered proximity indicator is finally used by the commissioning device to determine if the node is close enough for commissioning.

Advantageously, the controller is further configured to estimate a second proximity indicator for each one of the at least one node, based on the other type of beacons comprising the proximity indicator received from each one of the at least one node; and to generate the registered proximity indicator for each one of the at least one node, according to both the proximity indicator comprised in the other type of beacons and the estimated second proximity indicator.

Although the invention is directed to employ a one-to-many beaconing topology, the topology of the source device (s) of the beacons and the intended destination device(s), for efficient proximity estimation, it is preferable to make use of the second type of beacons to support further measurements at the commissioning device side. This is especially beneficial when the link is not completely symmetrical between the node and the commissioning device. While channel symmetry is a common assumption adopted for wireless communications, there might be several aspects leading to certain symmetry impairments, such as asymmetric transmit power, hardware sensitivity difference, antenna configuration difference, or frequency mismatch between the two devices. By considering both the proximity indicator measured by the node and the second proximity indicator measured by the commissioning device itself, the commissioning device can get a better assessment of the proximity, and minimize the impact from an asymmetric link on the commissioning procedure. The commissioning device can also apply certain weights in combining the two kinds of estimation on proximity based on its confidence to those values.

Advantageously, the second transmitter is further configured to send a request for commissioning to the at least one node via the second wireless communication protocol, when the registered proximity indicator of the at least one node is equal to or above the second predefined threshold.

The commissioning device sends a request for commissioning to the at least one node that is sufficiently close. This prevents the commissioning device to commission a node erroneously to the network, such as a node from another group, another room or another building. The second predefined threshold can be configured based on the type of applications, the density of the nodes, the security requirements, or the deployment environment.

Preferably, the controller is further configured to determine an order of priority to commission more than one node out of the plurality of nodes according to the registered proximity indicators of each one of the more than one node, when the at least one node comprises more than one node. Correspondingly, the second transmitter is further configured to send a sequence of requests to the more than one node via the second wireless communication protocol, to commission each one of the more than one node sequentially according to the order determined by the controller.

When more than one node are considered to be close enough for commissioning, the commissioning device is configured to send the request for commissioning in the order of proximity, which means the closest by node has the highest priority to get commissioned. This also prevents any chaos in commissioning a large number of nodes deployed in a high-density network.

In accordance to a third aspect of the invention, a system is provided. A system for carrying out proximity-based commissioning of a node to a network operating according to a first wireless communication protocol, the system comprising the node according to the present invention; and a commissioning device according to the present invention.

In accordance to another aspect of the invention, a method is provided for execution by a node out of a plurality of nodes, to have the node assist in proximity-based commissioning of the plurality of nodes to a network operating according to a first wireless communication protocol by a commissioning device, the method comprises the node
  detecting a first type of beacons from the commissioning device via a second wireless communication protocol with a first initial duty cycle applied to a first receiver;
  sending a second type of beacons at an initial beacon rate via the second wireless communication protocol;
  determining a proximity indicator, the proximity indicator reflecting the proximity between the node and the commissioning device based on the first type of beacons detected;
  updating the second type of beacons when the proximity indicator is available, the updated second type of beacons comprising the proximity indicator;
  sending the updated second type of beacons at an increased beacon rate as compared to the initial beacon rate via the second wireless communication protocol, when the estimated proximity indicator is equal to or above a predefined threshold. Furthermore, the node is transmitting only when it is not detecting.

In one example, the node may change the beacon rate adaptively according to the value of the estimated proximity indicator. When the commissioning device is not considered to be close enough, such as the proximity indicator is below the predefined threshold, the node may send the updated second type of beacons at the initial beacon rate via the second wireless communication protocol.

In accordance to a further aspect of the invention, a method of a commissioning device is provided. A method of a commissioning device for carrying out an efficient proximity-based commissioning of a plurality of nodes to a network operating according to a first wireless communication protocol, the method comprises the commissioning device:
  sending a first type of beacons via a second wireless communication protocol with a second initial duty cycle applied to the second transmitter;
  detecting another type of beacons from at least one node out of the plurality of nodes via the second wireless communication protocol;
  determining if the other type of beacons from the at least one node comprise a proximity indicator;
  generating a registered proximity indicator for each one of the at least one node, and wherein the registered proximity indicator is determined according to the proximity indicator comprised in the other type of beacons received from each one of the at least one node; and
  determining for each one of the at least one node if it is close enough for commissioning, by verifying if the registered proximity indicator is equal to or above a second predefined threshold. Furthermore, the commissioning device is detecting only when it is not sending.

The invention may further be embodied in a computer program comprising code means which, when the program is executed by a node of a network comprising processing means or a commissioning device comprising processing means, cause the processing means to carry out any one of the methods of the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
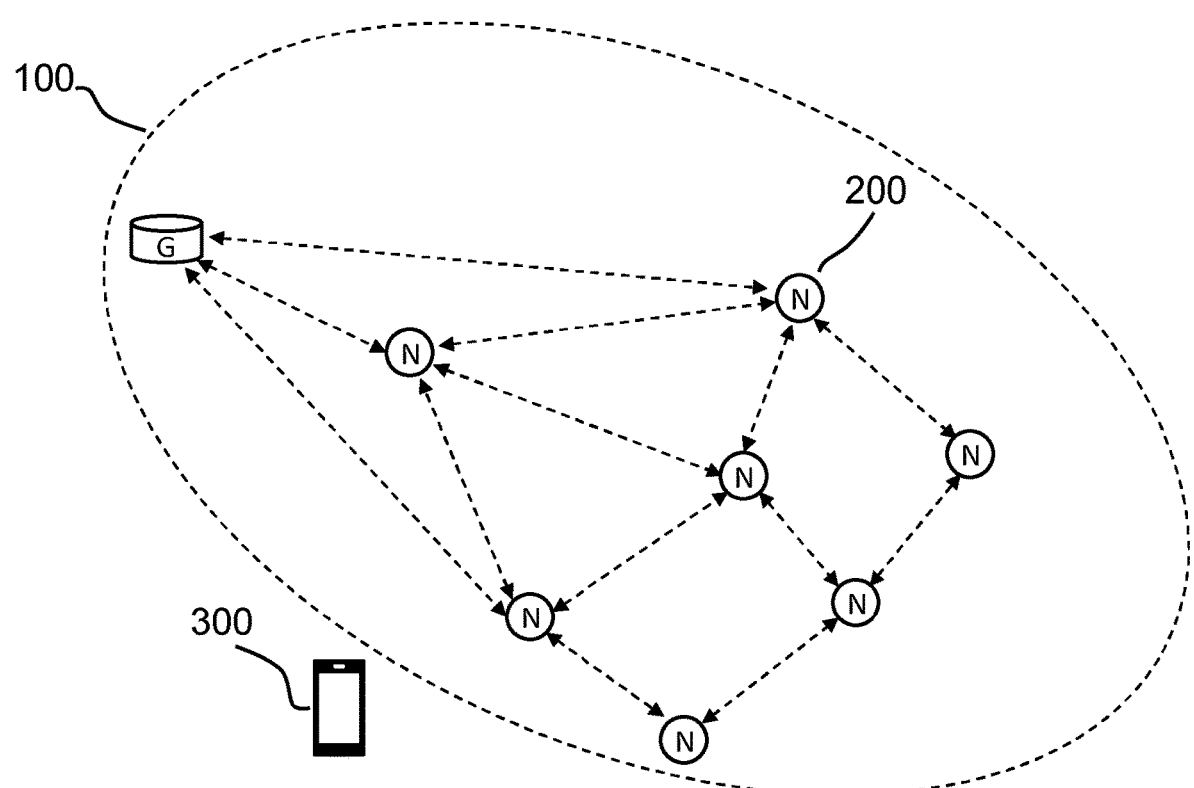
FIG. 1 demonstrates an overview of the system where a plurality of nodes are to be commissioned by a commissioning device to a network.

Various embodiments of the present invention will now be described based on a plurality of nodes 200 to be commissioned by a commissioning device 300 to a network 100, as shown in FIG. 1. The plurality of nodes 200 can be factory new devices to be commissioned to a network 100. The network can be a local network to serve a certain control purpose. The network can also be connected to the cloud or a backbone network, via a gateway G, a bridge, or a router device. In a lighting context, a node 200 may be comprised in a lighting device, a luminaire, a sensor, or a switch to serve for the communication function of the lighting device, the luminaire, the sensor, or the switch. A node 200 may also be comprised in a HVAC system, a smart refrigerator, a smart oven, other smart white goods, or a remote controller in a broader home automation context. The commissioning device may be a smart phone, a remote controller, or a stand-alone device with a commissioning tool function.

In a proximity-based commissioning approach, the commissioning device will commission each node in order according to the proximity between the commissioning device and the node. The benefit is that it greatly reduces the chance that a wrong node will be commissioned to the network, or a node will be commissioned to a wrong network. This is because the commissioning engineer who holds the commissioning device is in close vicinity to the node to be commissioned, and the distance bounding provides a kind of authentication. In a conventional approach, the factory new device, or the node will send out beacons regularly in order to attract the commissioning device. And then, upon receiving the beacons from the node, the commissioning device is aware of the existence of the node, and to further determine the proximity according to the propagation characteristics of the beacons detected, such as RSSI or LQI information derived from the beacons. To derive a reliable RSSI or LQI information, the commissioning device may require several beacons to get a good estimation. However, a new problem may occur when there are a large number of nodes deployed in a dense network. Each one of the plurality of nodes sends out beacons to invite the commissioning device for commissioning. Those beacons from different nodes may conflict with each other. And hence, the commissioning device may have difficulty detecting valid beacons in order to distinguish each node individually and to further derive the proximity information indicative of the proximity of a respective node to the commissioning device for each node.

Thus, inventors have recognized and appreciated that it would be beneficial to improve the known proximity-based commissioning method. Instead of deriving the proximity information directly by the commissioning device using many-to-one beaconing, the present invention proposes that the commissioning device obtains the proximity information via feedback from the nodes in response to beacons sent from the commissioning device to the plurality of nodes in a one-to-many beaconing approach. Since the nodes are detecting the beacons instead of sending beacons most of the time, collisions among beacons from different nodes are greatly reduced.

Figure 2:
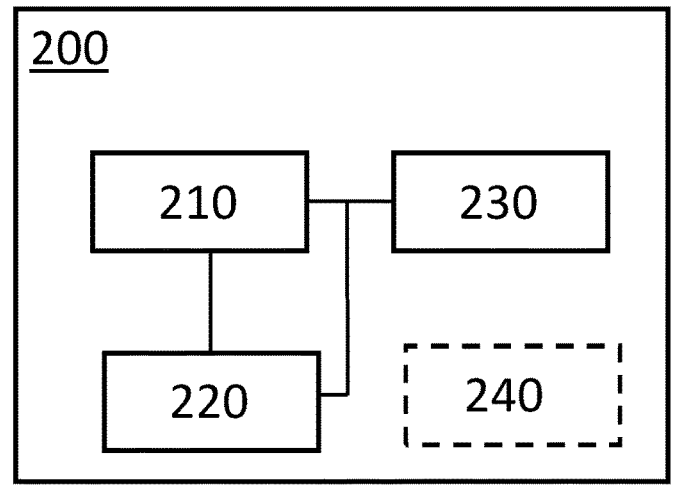
FIG. 2 schematically depicts basic components of a node.

FIG. 2 schematically depicts basic components of a node 200. A first receiver 210 is configured to detect the first type of beacons from the commissioning device via the second wireless communication protocol. Detecting indicates that the first receiver starts with monitoring the channel and trying to receive the first type of beacons. In a BLE case, the first type of beacons can be non-connectable advertisement from the commissioning device, which are used mainly for the nodes to derive the proximity information and identifying the existence of the commissioning device in their vicinity. As aforementioned, at start the node spends most of its time monitoring the channel to detect the beacons from the commissioning device. Typically, the first receiver is operated with an on-and-off cycle. The on period should at least cover the duration of one complete beacon from the commissioning device and the initial duty cycle applied to the first receiver is preferably larger than 50%. A first transmitter 220 is configured to send a second type of beacon via the second wireless communication protocol. In a BLE case, the second type of beacons can be connectable advertisements from the node to invite the commissioning device for commissioning. To avoid conflict among the second type of beacons from multiple nodes in the close vicinity, the first transmitter is configured to send the second type of beacons at an initial beacon rate, or equivalently at an initial beacon/advertisement interval. Preferably, the initial beacon interval may be set to 300 ms or larger, which means the initial beacon rate may be set around 3.33 Hz or lower. It is also more efficient for the node to keep the beacon rate low when it is not sure if there is a commissioning device in the surroundings. In one example, the node may not send the second type of beacons until it has received a first type of beacon from the commissioning device. After the node has detected the first type of beacons from the commissioning device, it would preferably reduce the beacon interval to 100 ms or less in order to facilitate setting up the connection. A controller 230 is configured to determine a proximity indicator reflecting the proximity between the node and the commissioning device based on the first type of beacons detected by the first receiver. When the proximity indicator is available, the first transmitter 220 includes the proximity indicator in the second type of beacons to provide a feedback on the proximity to the commissioning device.

When it is estimated by the node that the commissioning device is in close vicinity, such as the proximity indicator is equal to or above a predefined threshold, the first transmitter sends the updated second type of beacons more frequently to speed up the procedure to be discovered by the commissioning device. Correspondingly, with close vicinity, the node may already obtain a good estimation on the proximity, and there is no need to keep the first receiver detecting the channel for a high duty cycle. Therefore, the first receiver will adapt to reduce the first initial duty cycle for power saving, which also allows the first transmitter to have more freedom in sending the second type of beacons. The beacon rate of sending the second type of beacons can also be set adaptive to the value of the proximity indicator.

Furthermore, the first transmitter can optimize its output power given the proximity information derived. At start, the first transmitter will typically send the second type of beacons with its maximum output power for a largest coverage. After the node identifies that it is in close vicinity to the commissioning device, the first transmitter can adaptively reduce its output power as long as it guarantees that the second type of beacons arrives at the commissioning device side with sufficient signal to noise ratio (SNR). In such a manner, one benefit is that the first transmitter can spend less power on sending the second type of beacons. Another benefit is that less nodes will be interfered by the beacons from the first transmitter considering that a smaller coverage will be resulted from the reduced output power level.

Optionally, the node 200 may further comprise an application controller or an actuator, as indicated by 240 in FIG. 2. Such application controller or actuator is related to the control functionality of the node either in a lighting context or a broader home automation context.

Figure 3:
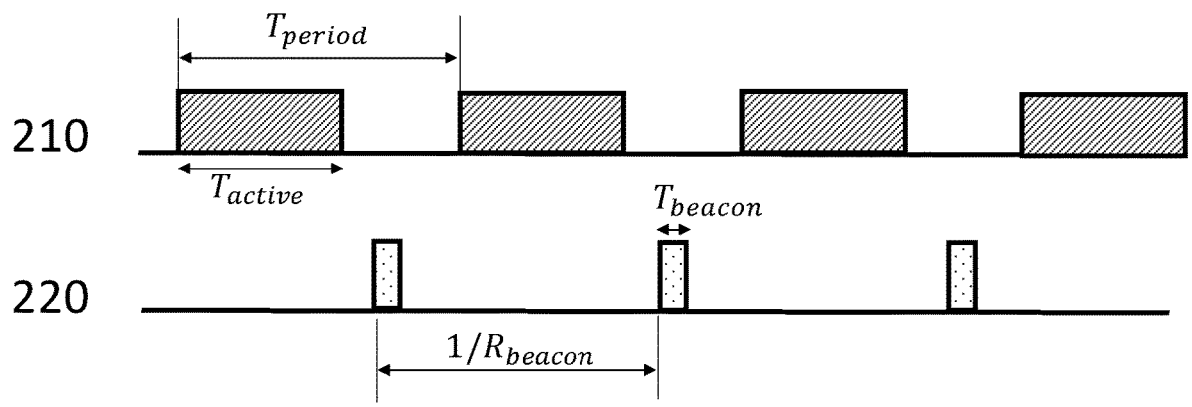
FIG. 3 illustrates the time domain scheduling of the first receiver and first transmitter comprised in a node.

Referring to FIG. 3, the time scheduling of the first transmitter and first receiver is illustrated. Although the first receiver and the first transmitter are disclosed as two dedicated devices, they can also be integrated as a single transceiver operating in a time multiplexed manner. $T_{period}$ indicates a full cycle of the first receiver, and $T_{active}$ indicates that the first receiver is active for detection. $T_{active}$ should cover at least one complete first type of beacon from the commissioning device. the first transmitter is configured to send only when the first receiver is not detecting. And the duration of the second type of beacon is indicated with $T_{beacon}$ in the figure. The time interval between two adjacent second type of beacons is $1/R_{beacon}$, where $R_{beacon}$ is the beacon rate of the first transmitter. When the node estimates that the commissioning device is nearby, it can adaptively send the second type of beacon more frequently in the duration when the first receiver is not active for detecting, by increasing the beacon rate $R_{beacon}$.

It can be seen that the second type of beacons are mainly for a point-to-point connection. It is preferred that the second wireless communication protocol is in accordance with a Bluetooth low energy, BLE, standard. It can also be Wi-Fi direct, Zigbee Touchlink, or another wireless communication standard that favours an easy setup for point-to-point connection.

The network that the plurality of nodes are to be commissioned to is operating according to the first communication protocol. The first wireless communication protocol is mainly to support the control function of the plurality of nodes, such as lighting control or building automation. Preferably, the first wireless communication protocol supports a multi-hop technology, which can be Zigbee, Thread, Bluetooth Mesh, Wi-Fi mesh, WirelessHART, SmartRF, CityTouch, IP500, Z-wave, or any other mesh or tree-based technology.

Figure 4:
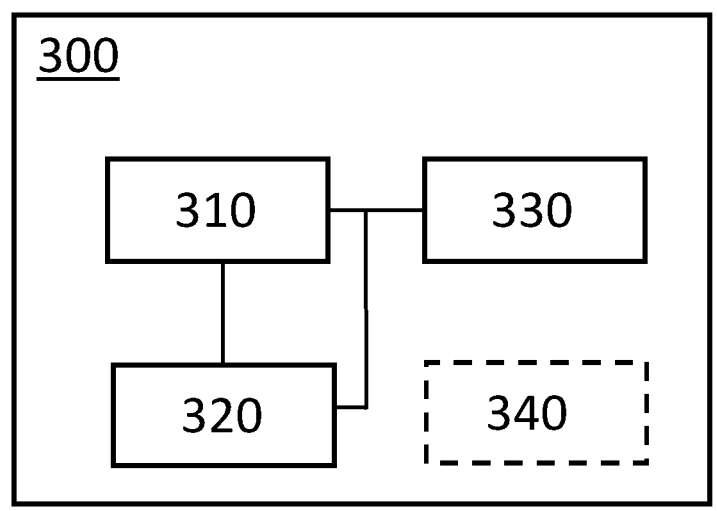
FIG. 4 schematically depicts basic components of a commissioning device.

FIG. 4 schematically depicts basic components of a commissioning device. A second transmitter 320 is configured to send the first type if beacons via the second wireless communication protocol with a second initial duty cycle applied to the second transmitter. As aforementioned, to facilitate the plurality of nodes to derive the proximity information in a more efficient manner, the commissioning device is configured to send the first type of beacons frequently. The second transmitter may send several first type of beacons consecutively during one on period of its cycle. A second receiver 310 is configured to detect the other type of beacons from the nodes in the neighbourhood. The other type of beacons can be the second type of beacons, or the updated second type of beacons with proximity indicator included, or the further updated second type of beacons with both the proximity indicator and the reduced output power level. Upon the detection of the other type of beacons, a controller 330 is configured to generate a registered proximity indicator for each one of the nodes from which the second receiver receives a beacon with proximity information included. The registered proximity indicator can be the same information as the proximity indicator provided by the node. It can also be derived from both the proximity indicator provided by the node and a second proximity indicator derived by the commissioning device locally based on the other type of beacons received. Depending on the confidence of the commissioning device about the symmetricity of the bi-directional wireless channels, different weights can be applied in the calculation in determining the registered proximity indicator depending on the confidence that the commissioning device has about the feedbacked proximity indicator or the estimated second proximity indicator. In an extreme case, the commissioning device may also neglect one out of the two indicators in determining the registered proximity indicator, if there is a big difference between the two estimations.

When the registered proximity indicator is equal to or above a second predefined threshold, the commissioning device determines that the relevant node is close enough for commissioning. And a request will be sent by the commissioning device to the node to start a session related to the information needed for preparing the node to connected to the network. When there is more than one node identified by the commissioning device as being close enough, a commissioning order will be determined (prioritization) by the commissioning device according to the registered proximity indicators. And then, a sequence of requests will be sent sequentially to each one of the more than one node according to the order determined.

As indicated in FIG. 4, the commissioning device may optionally comprise a user interface 340. Given that the commissioning device may be a smart phone, a remote controller, or a stand-alone device with a commissioning tool function, a user interface 340 may provide extra convenience to the commissioner in carrying out the commissioning task.

Figure 5:
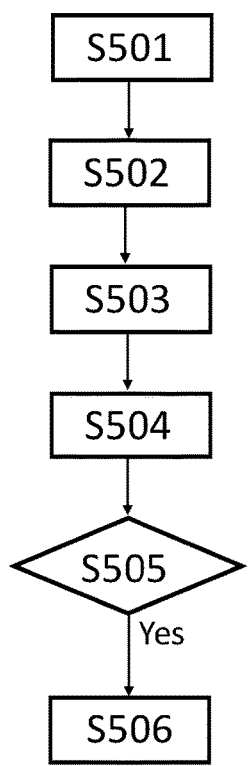
FIG. 5 shows a flow diagram of a method carried out by a node.

FIG. 5 shows a flow diagram of a method 500 carried out by a node 200. In step S501, the node detects a first type of beacons from the commissioning device via a second wireless communication protocol with a first initial duty cycle applied to a first receiver. In step S502, the node sends a second type of beacons at an initial beacon rate via the second wireless communication protocol. Then the node determines, in step S503, a proximity indicator, the proximity indicator reflecting the proximity between the node and the commissioning device based on the first type of beacons detected. With the proximity indicator available, in step S504 the node updates the second type of beacons by including the proximity indicator in the second type of beacons. And in step S505, the node determines if the proximity indicator is equal to or above a predefined threshold, which indicates that the commissioning device is sufficiently close. If yes, the node sends the updated second type of beacons at an increased beacon rate as compared to the initial beacon rate via the second wireless communication protocol in step S506. Otherwise, the node may remain the initial beacon rate.

Figure 6:
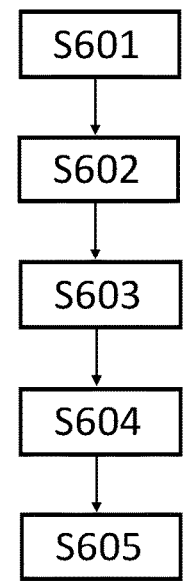
FIG. 6 shows a flow diagram of a method carried out by a commissioning device.

FIG. 6 shows a flow diagram of a method 600 carried out by a commissioning device 300. In step S601, the commissioning device 300 sends a first type of beacons via a second wireless communication protocol with a second initial duty cycle applied to the second transmitter. In step S602, the commissioning device 300 detects another type of beacons from at least one node out of the plurality of nodes via the second wireless communication protocol. Then the commissioning device 300 determines, in step S603, if the other type of beacons from the at least one node comprise a proximity indicator. If yes, the commissioning device 300 generates a registered proximity indicator for each one of the at least one node in step S604, and wherein the registered proximity indicator is determined according to the proximity indicator comprised in the other type of beacons received from each one of the at least one node. In step S605, the commissioning device 300 determines for each one of the at least one node if it is close enough for commissioning, by verifying if the registered proximity indicator is equal to or above a second predefined threshold.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A node out of a plurality of nodes for assisting a proximity-based commissioning of the plurality of nodes by a commissioning device to a network operating according to a first wireless communication protocol, the node comprising:
   a receiver configured to detect a first type of beacons from the commissioning device via a second wireless communication protocol, with a first initial duty cycle applied to the receiver;
   a transmitter configured to send a second type of beacons at an initial beacon rate via the second wireless communication protocol; wherein the second wireless communication protocol is different from the first wireless communication protocol; and
   a controller configured to determine a proximity indicator, the proximity indicator reflecting a proximity between the node and the commissioning device based on the first type of beacons detected by the receiver; and
   wherein the transmitter is further configured to:
   update the second type of beacons when the proximity indicator is available, the updated second type of beacons comprising the proximity indicator;
   send the updated second type of beacons at an increased beacon rate as compared to the initial beacon rate via the second wireless communication protocol, when the proximity indicator is equal to or above a predefined threshold;
   and wherein the transmitter is further configured to transmit only when the receiver is not detecting, wherein the transmitter transmits at different time periods from when the receiver is detecting.

2. The node of claim 1, wherein the proximity indicator is a moving average value of a propagation characteristic of the first type of beacons detected by the receiver.

3. The node of claim 1, wherein the proximity indicator is an average link quality indicator, LQI, or an average received signal strength indicator, RSSI, value, of the first type of beacons detected by the receiver.

4. The node of claim 1, wherein the second wireless communication protocol is in accordance with a Bluetooth low energy, BLE, standard.

5. The node of claim 1, wherein the first wireless communication protocol is in accordance with a Zigbee standard.

6. The node of claim 1, wherein the receiver is further configured to detect the first type of beacons from the commissioning device with a reduced duty cycle lower than the first initial duty cycle applied to the receiver, when the proximity indicator is equal to or above the predefined threshold.

7. The node of claim 1, wherein the transmitter is configured to transmit at a default output power level and the transmitter is further configured to:
derive a reduced output power level as compared to the default output power level dependent on the proximity indicator;
further update the second type of beacons by further comprising information on the reduced output power level; and
send the further updated second type of beacons at the reduced output power level.

8. A commissioning device for carrying out an efficient proximity-based commissioning of a plurality of nodes to a network operating according to a first wireless communication protocol, the commissioning device comprising:
a transmitter configured to send a first type of beacons via a second wireless communication protocol with a second initial duty cycle applied to the transmitter;
a receiver configured to detect another type of beacons from at least one node out of the plurality of nodes via the second wireless communication protocol; wherein the second wireless communication protocol is different from the first wireless communication protocol;
a controller configured to determine the another type of beacons, detected by the receiver from the at least one node, comprise a proximity indicator; and
wherein the controller is further configured to:
generate a registered proximity indicator for each one of the at least one node, and wherein the registered proximity indicator is determined according to the proximity indicator comprised in the another type of beacons received from each one of the at least one node; and
determine for each one of the at least one node if it is close enough for commissioning, by verifying if the registered proximity indicator is equal to or above a second predefined threshold; and
wherein the receiver is further configured to detect only when the transmitter is not transmitting, wherein the receiver detects at different time periods from when the transmitter transmits.

9. The commissioning device of claim 8, wherein the controller is further configured to:
estimate a second proximity indicator for each one of the at least one node, based on the another type of beacons comprising the proximity indicator received from each one of the at least one node; and
generate the registered proximity indicator for each one of the at least one node, according to both the proximity indicator comprised in the another type of beacons and the estimated second proximity indicator.

10. The commissioning device of claim 8, wherein the transmitter is further configured to:
send a request for commissioning to the at least one node via the second wireless communication protocol, when the registered proximity indicator of the at least one node is equal to or above the second predefined threshold.

11. The commissioning device of claim 8, wherein the controller is further configured to:
determine an order of priority to commission more than one node out of the plurality of nodes according to the registered proximity indicators of each one of the more than one node, when the at least one node comprises more than one node; and
wherein the transmitter is further configured to:
send a sequence of requests to the more than one node via the second wireless communication protocol, to commission each one of the more than one node sequentially according to the order determined by the controller.

12. A system for carrying out proximity-based commissioning of a node to a network operating according to a first wireless communication protocol, the system comprising:
the node according to claim 1.

13. A method of a node out of a plurality of nodes assisting in proximity-based commissioning of the plurality of nodes to a network operating according to a first wireless communication protocol by a commissioning device, the method comprising the node:
detecting a first type of beacons from the commissioning device via a second wireless communication protocol with a first initial duty cycle applied to a receiver;
sending a second type of beacons at an initial beacon rate via the second wireless communication protocol; wherein the second wireless communication protocol is different from the first wireless communication protocol;
determining a proximity indicator, the proximity indicator reflecting a proximity between the node and the commissioning device based on the first type of beacons detected;
updating the second type of beacons when the proximity indicator is available, the updated second type of beacons comprising the proximity indicator; and
sending the updated second type of beacons at an increased beacon rate as compared to the initial beacon rate via the second wireless communication protocol, when an estimated proximity indicator is equal to or above a predefined threshold;
and wherein the node is transmitting only when it is not detecting, wherein the transmitter transmits at different time periods from when the receiver is detecting.

14. A method of a commissioning device for carrying out an efficient proximity-based commissioning of a plurality of nodes to a network operating according to a first wireless communication protocol, the method comprising the commissioning device:
sending a first type of beacons via a second wireless communication protocol with a second initial duty cycle applied to the transmitter;
detecting another type of beacons from at least one node out of the plurality of nodes via the second wireless communication protocol; wherein the second wireless communication protocol is different from the first wireless communication protocol;
the method further comprises the commissioning device:
determining the another type of beacons from the at least one node comprise a proximity indicator;
generating a registered proximity indicator for each one of the at least one node, and wherein the registered proximity indicator is determined according to the proximity indicator comprised in the another type of beacons received from each one of the at least one node; and
determining for each one of the at least one node if it is close enough for commissioning, by verifying if the registered proximity indicator is equal to or above a second predefined threshold; and wherein the commissioning device is detecting only when it is not transmitting, wherein the commissioning device detects at different time periods from when the transmitter transmits.

15. A non-transitory computer readable medium comprising instructions which, when the instructions are executed by:

a processor of a node of a network, cause the processor to perform the method of claim 13.

* * * * *